United States Patent
Kaijala

(10) Patent No.: US 7,272,979 B2
(45) Date of Patent: Sep. 25, 2007

(54) SEAT BELT TENSION SENSOR HAVING AN INTEGRAL CONNECTOR

(75) Inventor: Murray Kaijala, Elkhart, IN (US)

(73) Assignee: CTS Corporation, Elkhart, IN (US)

( * ) Notice: Subject to any disclaimer, the term of this patent is extended or adjusted under 35 U.S.C. 154(b) by 157 days.

(21) Appl. No.: 11/206,354

(22) Filed: Aug. 18, 2005

(65) Prior Publication Data

US 2005/0274203 A1   Dec. 15, 2005

Related U.S. Application Data

(63) Continuation-in-part of application No. 10/388,816, filed on Mar. 14, 2003, now Pat. No. 7,086,297, which is a continuation-in-part of application No. 09/923,151, filed on Aug. 6, 2001, now Pat. No. 6,578,432, which is a continuation-in-part of application No. 09/884,615, filed on Jun. 19, 2001, now Pat. No. 6,647,811.

(51) Int. Cl.
    *B60R 22/18* (2006.01)

(52) U.S. Cl. .................. 73/862.391; 73/862.393; 73/862.472

(58) Field of Classification Search .......... 73/862.391, 73/862.393, 862.472
    See application file for complete search history.

(56) References Cited

U.S. PATENT DOCUMENTS

| | | | |
|---|---|---|---|
| 2,984,102 A | 5/1961 | Arne Soderholm | |
| 3,805,600 A | 4/1974 | Powell et al. | |
| 4,616,504 A * | 10/1986 | Overcash et al. | 73/118.1 |
| 4,943,087 A | 7/1990 | Sasaki | |
| 5,060,977 A | 10/1991 | Saito | |
| 5,181,739 A | 1/1993 | Bauer | |
| 5,244,231 A | 9/1993 | Bauer | |
| 5,309,135 A | 5/1994 | Langford | |
| 5,494,311 A | 2/1996 | Blackburn | |
| 5,545,591 A | 8/1996 | Mazur | |
| 5,570,903 A | 11/1996 | Meister | |
| 5,583,476 A | 12/1996 | Langford | |
| 5,605,348 A | 2/1997 | Blackburn | |
| 5,618,056 A | 4/1997 | Schoos | |
| 5,636,864 A | 6/1997 | Hori | |
| 5,765,774 A | 6/1998 | Maekawa | |
| 5,960,523 A | 10/1999 | Husby | |
| 5,965,827 A | 10/1999 | Stanley | |
| 5,996,421 A | 12/1999 | Husby | |
| 6,081,759 A | 6/2000 | Husby | |

(Continued)

FOREIGN PATENT DOCUMENTS

WO    WO99/12012    3/1999

*Primary Examiner*—Edward Lefkowitz
*Assistant Examiner*—Freddie Kirkland, III
(74) *Attorney, Agent, or Firm*—Mark P. Bourgeois

(57) ABSTRACT

A seat belt tension sensor for measuring the amount of tension in a vehicle seat belt. The seat belt tension sensor has a housing and an anchor plate that is mounted in the housing. The housing moves relative to the anchor plate. A magnet is affixed to the anchor plate. A sensor is mounted to the housing. The sensor generates an electrical signal in response to relative movement between the housing and the anchor plate. The electrical signal changes in proportion to the amount of tension on the seat belt. A spring is mounted between the housing and the anchor plate. The spring biases the housing from the anchor plate. An integral connector extends from the housing.

18 Claims, 3 Drawing Sheets

U.S. PATENT DOCUMENTS

| | | |
|---|---|---|
| 6,151,540 A | 11/2000 | Anishetty |
| 6,161,439 A | 12/2000 | Stanley |
| 6,205,868 B1 | 3/2001 | Miller |
| 6,209,915 B1 | 4/2001 | Blakesley |
| 6,211,668 B1 | 4/2001 | Duesler |
| 6,230,088 B1 | 5/2001 | Husby |
| 6,264,236 B1 | 7/2001 | Aoki |
| 6,264,281 B1 | 7/2001 | Dukatz |
| 6,301,977 B1 | 10/2001 | Stojanovski |
| 6,307,977 B1 | 10/2001 | Eldridge et al. |
| 6,336,371 B1 | 1/2002 | O'Boyle |
| 6,400,145 B1 | 6/2002 | Chamings et al. |
| 6,450,534 B1 | 9/2002 | Blakesley |
| 6,520,540 B1 | 2/2003 | Siegfried et al. |
| 6,554,318 B2 | 4/2003 | Kohut |
| 6,578,432 B2 | 6/2003 | Blakesley |
| 6,647,811 B2 | 11/2003 | Blakesley |
| 6,688,185 B2 | 2/2004 | Knox et al. |
| 6,729,194 B2 | 5/2004 | Kaijala |
| 6,776,056 B2 | 8/2004 | Garver |
| 6,858,835 B2 * | 2/2005 | Smith ............ 250/231.1 |
| 6,860,160 B2 * | 3/2005 | Curtis et al. ........ 73/862.391 |
| 7,055,400 B2 * | 6/2006 | Curtis et al. ........ 73/862.393 |
| 7,116,008 B2 * | 10/2006 | Kitamura et al. ........ 307/9.1 |
| 2001/0005423 A1 | 6/2001 | Faigle |
| 2001/0042981 A1 | 11/2001 | Kohut et al. |
| 2002/0024205 A1 | 2/2002 | Curtis |
| 2002/0035878 A1 | 3/2002 | Norton |
| 2003/0066362 A1 | 4/2003 | Lee et al. |
| 2003/0150283 A1 | 8/2003 | Stanley et al. |
| 2003/0184076 A1 | 10/2003 | Devereaux et al. |
| 2004/0017073 A1 | 1/2004 | Pavlov et al. |
| 2004/0023146 A1 | 2/2004 | Barnabo |

* cited by examiner

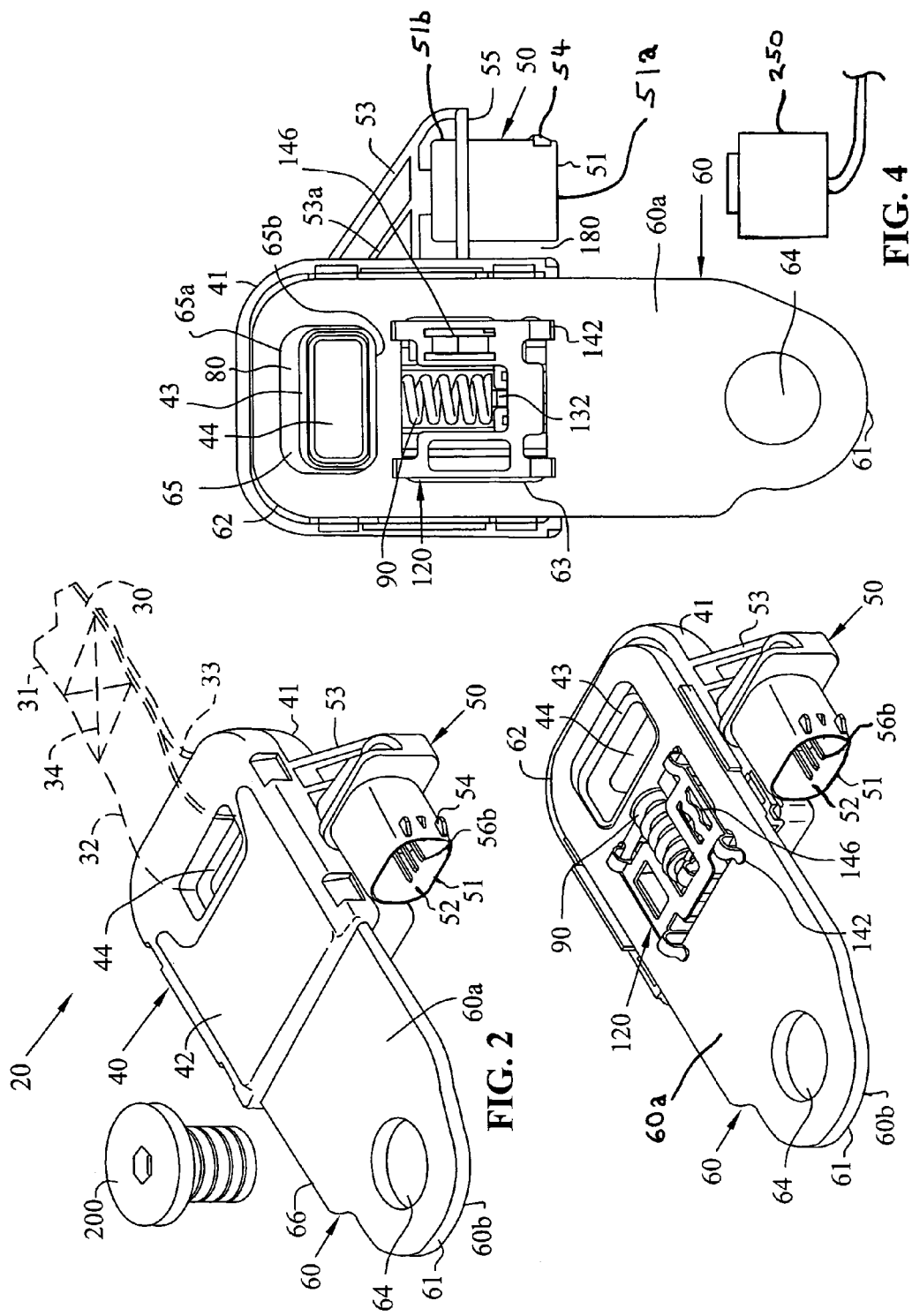

SEAT BELT TENSION SENSOR HAVING AN INTEGRAL CONNECTOR

CROSS-REFERENCE TO CO-PENDING AND RELATED APPLICATIONS

This application is a continuation-in-part of U.S. patent application Ser. No. 10/388,816, filed Mar. 14, 2003, now U.S. Pat. No. 7,086,297 and titled, "Seat Belt Tension Sensor Having Shock Isolation", which is a continuation-in-part of U.S. patent application Ser. No. 09/923,151, filed Aug. 6, 2001, now U.S. Pat. No. 6,578,432 and titled, "Seat Belt Tension Sensor", which is a continuation-in-part of U.S. patent application Ser. No. 09/884,615, filed Jun. 19, 2001, now U.S. Pat. No. 6,647,811 and titled, "Seat Belt Tension Sensor".

This application is related to U.S. Pat. No. 6,729,194, issued May 4, 2004 and titled, "Hall Effect Seat Belt Tension Sensor".

BACKGROUND

The foregoing pending applications and issued patents are herein incorporated by reference in their entirety.

1. Field of the Invention

This invention relates to an automobile sensor for detecting the magnitude of a tensile force in a seat belt used in a car seat, and in particular to a sensor that can detect the magnitude of tension in a seat belt and provide an electrical signal that is representative of the magnitude of tensile force.

2. Description of the Related Art

Air bags have been heralded for their ability to reduce injuries and save lives. However, since their incorporation into automobiles, a problem has existed with people of smaller size and small children. Air bags are designed to cushion the impact of occupants and thus reduce the injuries suffered. However, the force needed to properly cushion the occupant varies based on the size and position of the person.

For example, a larger person requires the bag to inflate faster and thus with more force. A smaller person may be injured by a bag inflating at this higher inflation force. A smaller person is more likely to be sitting close to the dashboard and would therefore stand a higher chance of being injured by the impact of the inflating bag, as opposed to the passenger hitting the fully inflated bag to absorb the impact of the accident. An average-sized person can also be injured by an airbag inflation if they are leaning forward, as for example, if they are adjusting the radio.

Because of the concern over injury to passengers in these situations, the National Highway Transportation Safety Administration (or NHTSA), an administrative agency of the United States, is instituting rules under FMVSS 208 requiring the air bag deployment system to identify the passenger size and position and inflate the air bag accordingly.

One way to accomplish this task is to use a seat belt tension sensor in conjunction with an occupant weight sensor. The weight sensor can provide an indication of the force placed by an occupant on the seat. However, if the seat belt is unduly tightened, it can place an additional downward force on the passenger, creating an erroneous weight reading. Similarly, it is common for infant car seats to be secured tightly to the seat. In this circumstance, it is critical for the system to recognize that the passenger does not warrant inflation of the air bag. By sensing the tension on the seat belt in addition to the weight reading from the seat, the actual weight of the occupant can be determined. This allows for the system to safely deploy the air bag.

SUMMARY

It is a feature of the present invention to provide a seat belt tension sensor for use with a seat belt in a vehicle.

Another feature of the invention is to provide a seat belt tension sensor that includes a housing, an anchor plate at least partially mounted in the housing. A sensor is mounted in the housing. The sensor generates an electrical signal that is indicative of the amount of tension on the seat belt. A connector is integral with and extends from the housing. Electrically conductive terminals are mounted in the connector.

BRIEF DESCRIPTION OF THE DRAWINGS

FIG. 2 is an assembled view of FIG. 1.

FIG. 3 is a perspective view of FIG. 2 with a cover removed.

FIG. 4 is a top view of FIG. 3.

It is noted that the drawings of the invention are not to scale.

DETAILED DESCRIPTION

Figure 1:
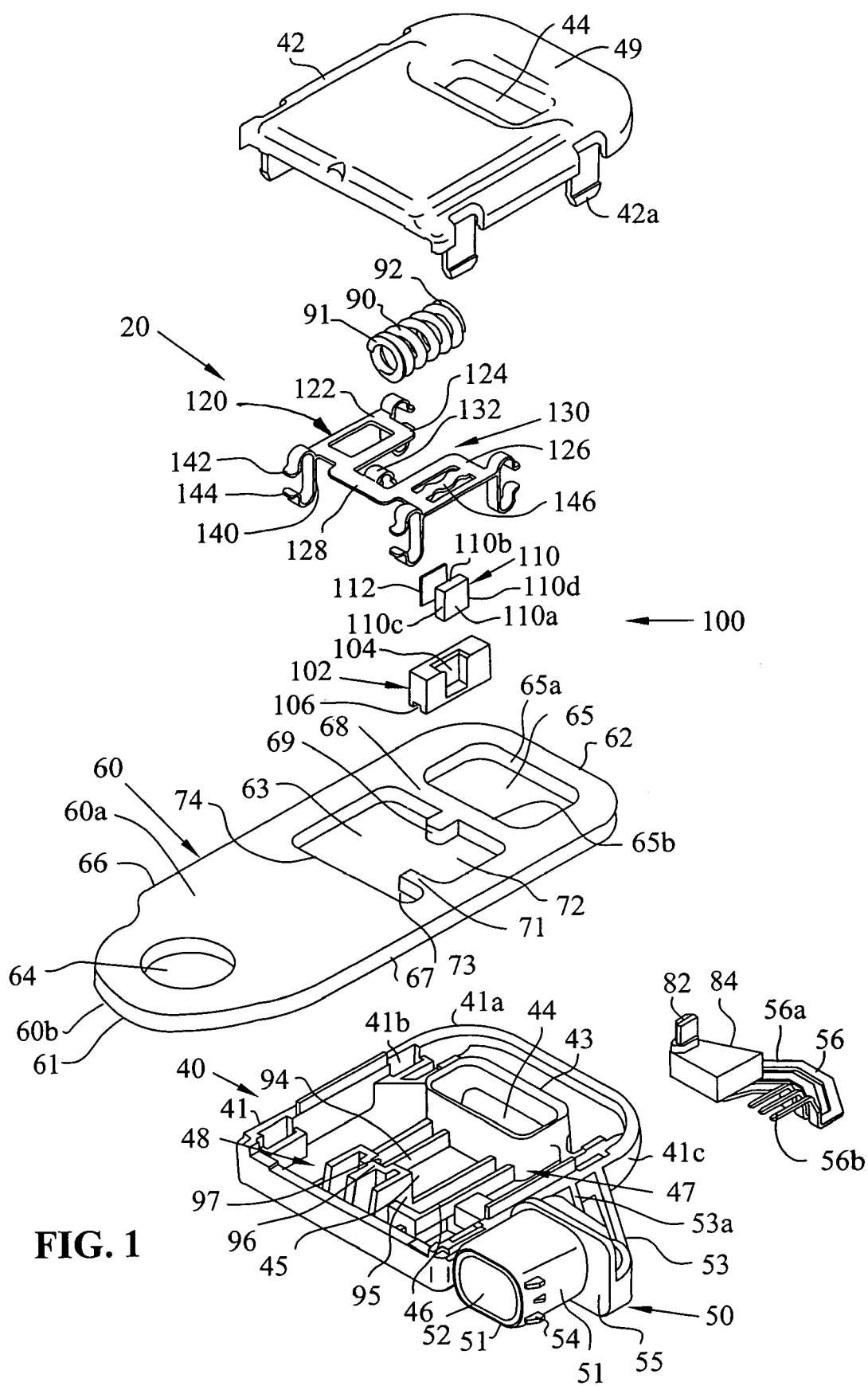
FIG. 1 is a perspective exploded view of a seat belt tension sensor in accordance with the present invention.
Figure 5:
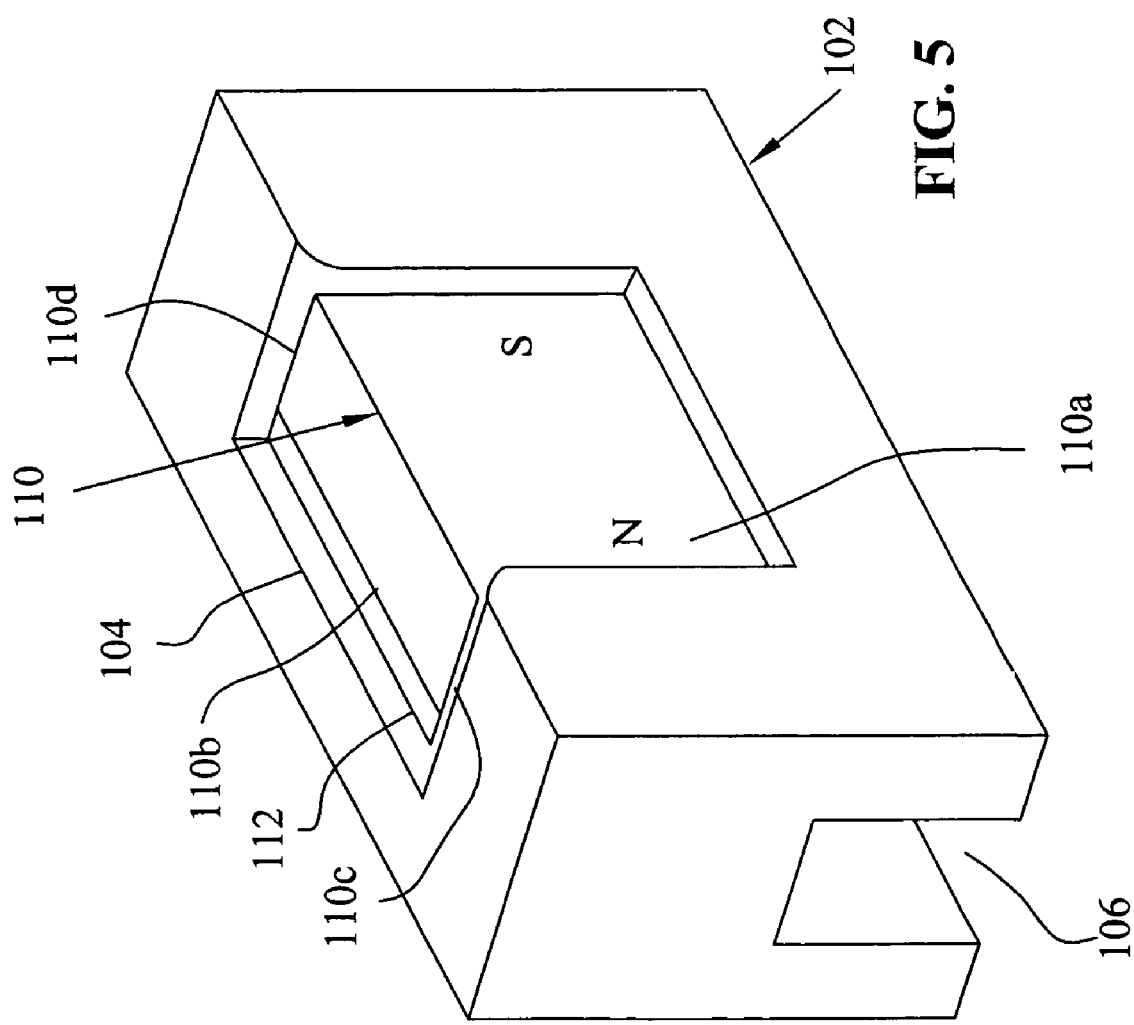
FIG. 5 is an enlarged view of a magnet carrier of the present invention.

The present invention is a seat belt tension sensor. Referring to FIGS. 1-4, a seat belt tension sensor assembly 20 is shown. Assembly 20 has a housing 40 and anchor plate 60. Housing 40 is fastened between a seat belt webbing 30 and a structural part of the vehicle such as a floor (not shown). The belt webbing 30 has an end 31, an end 32, a belt loop 33 and stitching 34 that retains end 32.

Housing 40 has a bottom portion 41, top portion 42, flange 43, hole 44, spring channel 45, bearing rail 46 and sensor mounting area 47. A cavity 48 is located within housing 40. The bottom portion 41 and top portion 42 connect together to form housing 40 and are held together by snap fitting tabs 42a in to slots 42b. Alternatively, ultrasonic welding along lip 41A can connect portions 41 and 42 together. Housing portion 42 has a recess or narrow portion 49 on an end of the housing where the seat belt wraps around.

An integral connector 50 extends from housing bottom portion 41. Connector 50 is integrally molded into housing portion 41 during injection molding of the housing. Integral connector 50 has a shroud 51 that has a recess 52. Shroud 51 has shroud ends 51A and 51B. Several latch tabs 54 are mounted on shroud 51. Plate 55 supports shroud 51. Shroud end 51A extends from one side of plate 55 and shroud end 51B extends from the other side of plate 55. A molded support or bracket 53 reinforces the attachment between integral connector 50 and housing portion 41. Molded support or bracket 53 extends between housing side 41C and a plate 55. Plate 55 connects between shroud 51 and side 41C. Bracket 53 has webbing 53A that adds additional mechanical strength to bracket 53. Shroud 51 is spaced from side 41C by an airgap 180 (FIG. 4).

Three electrically conductive metal terminals 56 have ends 56A and 56B. Terminals 56 are integrally molded into housing portion 41 during injection molding of the housing. Terminals 56 extend between sensor mounting area 47 in housing 40 and recess 52. Terminal ends 56A extend into sensor mounting area 47 and terminal ends 56B extend into recess 52 of shroud 51. Housing 41, bracket 53, plate 50 and shroud 51 can be molded from plastic. The plastic surrounds and support each terminal and insulates the terminals. Terminal end 56A is adapted to be connected to an external wire harness 250 (FIG. 4). The wire harness would fit over shroud 51 and be retained by latch tabs 54. Wire harness 250 would connect with an airbag controller (not shown).

In an alternative embodiment, terminals 56 could be press-fit into shroud 51, support 53 and housing 41. In this example, terminals 56 are retained by friction between the terminals and the surrounding structure primarily support 53.

The use of integral connector 50 has many advantages. Integral connector 50 eliminates the need for a separate wire harness and connector. Since integral connector 50 is rigidly held by bracket 53, a separate strain relief mechanism is not required. If a wire harness and connector was used, a separate strain relief mechanism would be required to prevent the wire harness from being pulled out of housing 40.

Integral connector 50 eliminates the need for a separate printed circuit board because hall effect device 82 is mounted directly to terminals 56.

A metal anchor plate 60 is fitted within housing 40. Anchor plate 60 has a top surface 60A and bottom surface 60B. Anchor plate 60 includes ends 61 and 62, a cutout 63, apertures 64 and 65 and sides 66 and 67. Anchor plate 60 further has edges 65A and 65B that are next to aperture 65. Arm 68 extends between sides 66 and 67 and separates aperture 65 and cutout 63. A projection 69 extends from arm 68 into cutout 63. Projection 71 extends into cutout 63. Projection 71 and arm 68 define a sensor mounting opening 72. Notch 73 is defined between projection 71 and an edge 74 of cutout 63.

Anchor plate 60 is mounted in cavity 48. Aperture 65 goes over and surrounds flange 43. A gap 80 (see FIG. 4) is formed between flange 43 and aperture 65.

Seat belt webbing 30 is attached through hole 44 and aperture 65. The end 32 of webbing 30 is routed through hole 44 and aperture 65, wrapped back onto itself forming loop 33 and sewn with stitching 34 to secure the seat belt webbing to assembly 20.

A coil spring 90 is mounted in spring channel 45. Spring 90 has ends 91 and 92. Spring channel 45 is defined by walls 94, 95 and 96 in housing 40. Spring end 92 is mounted over projection 69. The other spring end 91 rests against wall 96. Spring 90 is adapted to bias anchor plate 60 from housing 40 such that gap 80 is open. A slot 97 is located in wall 96.

A magnetic field sensor or hall effect device 82 is mounted to terminal end 56A and extends upwardly into sensor mounting area 47. Additional electronic components (not shown), such as an integrated circuit can also be attached to terminal ends 56A to condition the signal from the hall effect device 82. Since, terminals 56 are insert molded, hall effect device 82 is retained in the proper position in sensor mounting area 47. Hall effect device 82 can be mounted to terminal ends 56A by soldering.

Hall effect device 82 and ends 56*a* can be encapsulated with a sealant 84 such as silicone for protection.

A magnetic field generator or magnet assembly 100 includes a magnet carrier 102 and a magnet 110. Magnet carrier 102 has a cavity 104 and a slot or mortise 106. The magnet carrier is preferably formed from an insulative material such as a plastic. A magnet 110 has sides 110A and 110B and ends 110C and 110D. End 110C can be a north pole and end 110D can be a south pole. A steel pole piece 112 may be mounted on magnet side 110B. Pole piece 112 improves the shape of and guides the flux field generated by magnet 110. Pole piece 112 may be omitted if desired. Magnet 110 and pole piece 112 are mounted in and retained by cavity 104.

Magnet 110 can be formed from molded ferrite or can be formed from samarium cobalt or neodymium iron boron. Magnet 110 has a changing polarity along the length of the magnet.

The magnet 110 could also be a tapered magnet or could be a magnet that has a variable field strength along its length. The magnet 110 may have a variable polarization or a variable magnetic domain alignment along its length. Magnet 110 may also comprise more than one magnet and may be several magnets.

Magnet assembly 100 is mounted in sensor opening 72 and rests on rail 46. Bearing rail 46 extends into mortise or slot 106 such that magnet carrier 102 is supported by bearing rail 46. Magnet carrier 102 slides on bearing rail 46 as the housing 40 moves relative to the anchor plate 60.

A spring carriage 120 is between anchor plate 60 and housing 40. Spring carriage 120 is mounted in cutout 63. Spring carriage 120 attenuates motions other than in the primary load direction between anchor plate 60 and housing 40. In other words, spring carriage 120 prevents rattling. Spring carriage 120 has a unshaped body 122 that has legs 124, 126 and a bottom portion 128. An opening 130 is located between legs 124 and 126. A spring tab 132 extends into opening 130.

Four spring fingers 140 are mounted to body 122. One spring finger is located at each corner of body 122. Spring fingers 140 have an upper tang 142 and a lower tang 144. Spring fingers 140 extend from cutout 63 onto the top and bottom surfaces of anchor plate 60. Upper tang 142 is in contact with surface 60A. Lower tang 144 is in contact with surface 60B. Anchor plate 60 is squeezed between tangs 142 and 144.

Spring tab 132 fits into slot 97 and is able to press against spring 90. Spring tab 132 applies a reverse force to spring 90 and assists with overcoming geometrical tolerance issues due to variations in the dimensions of the components. Spring tab 132 also assists with alignment of spring 90 with respect to housing 40.

A bar 146 extends over magnet carrier 102. Bar 146 retains magnet carrier 102 in opening 72.

Seat belt tension sensor 20 can be attached to a vehicle floor or seat or other member (not shown) by a fastener 200 such as a bolt, rivet or screw. Fastener 200 goes through aperture 64 and is attached to a vehicle structure or seat. The fastener shown is threaded; however, other types of fasteners would work such as a rivet.

When a tension is applied to seat belt 30, housing 40 moves relative to the fixed anchor plate 60 resulting in the compression of spring 90. As housing 40 moves, hall effect device 82 is moved relative to magnet assembly 100 which is held fixed by fastener 200 through anchor plate 60.

As the tension in the seat belt increases, housing 40 will move further in relation to anchor plate 60. This causes the hall effect device 82 to move. At the same time bearing rail 46 slides within slot 106. The total travel distance can be about 1 to 3 millimeters. The hall effect device is located adjacent to magnet 110. A small air gap is located between hall effect device 82 and magnet 110. The hall effect device outputs an electrical signal that is proportional to the flux density of the perpendicular magnetic field that passes through the device. Since, the magnets have a north and south pole, the strength of the magnetic field varies as the polarity changes from one pole to the other along the length of the magnet.

Therefore, the resulting electrical output signal of the hall effect devices changes in proportion to the amount of tension in seat belt 30. This electrical signal is processed by electronic circuitry and provided to an external electrical circuit through terminals 56 to a conventional air bag controller or occupant classification module (not shown). The air bag controller can then use the seat belt tension information to compute a more accurate profile of the seat occupant and use that information to control deployment of the airbag.

The movement of housing 40 relative to the fixed anchor plate 60 is limited by the interaction of flange 43 with edges 65A and 65B. In a resting position with no tension placed on seat belt 30, spring 90 applies a force between arm 68 and wall 96 which results in the flange 43 moving into contact with edge 65B. After flange 43 touches edge 65B, housing 40 can no longer move toward end 61 of anchor plate 60. This position is defined as a rest or no tension position.

As tension is applied to seat belt 30, housing 40 will move away from end 61 of anchor plate 60 and spring 90 will start to be compressed. Housing 40 will move relative to anchor plate 60 and therefore hall effect device 82 will move relative to magnet 110.

As further tension is applied to seat belt 30, flange 43 will move into contact with edge 65A. After flange 43 touches edge 65A, housing 40 can no longer move away from end 61 of anchor plate 60. This position is defined as an overload position.

Any further tension applied to seat belt 30 after flange 43 engages edge 65B will be transferred to anchor plate 60 and bolt 200. The transfer of additional tension prevents further compression of spring 90 and protects magnet assembly 100 and hall effect device 82 from damage due to the possible application of large tension forces. This can be referred to as overload protection.

The use of seat belt tension sensor assembly 20 has many advantages. Seat belt tension sensor assembly 20 allows for the measurement of seat belt tension in a compact package with a small number of components. Seat belt tension sensor assembly 20 has a small amount of motion while still being able to determine the amount of tension in a seat belt. Seat belt tension sensor assembly 20 has an overload protection mechanism that prevents excessive seat belt tension from damaging the sensing components.

The seat belt tension sensor of the present invention has additional advantages. It allows accurate sensing of seat belt tension, without excessive movement of the seat belt. The seat belt tension sensor allows an airbag controller to make better decisions as to when and how to deploy and airbag based upon more accurate seat occupant information. In the case of a child's car seat being strapped into a car seat, the seat belt tension sensor in conjunction with a seat weight sensor allows the airbag controller to properly compute that the seat occupant has a low weight and to prevent deployment of the airbag.

While the housing with an integral connector was shown used in combination with a magnet and magnetic field sensor, any suitable type of sensor can be used with the integral connector. For example a strain gage sensor could be used in combination with an integral connector. Other sensors such as inductive, optical, capacitive or pressure could also be used with an integral connector.

While the invention has been taught with specific reference to these embodiments, someone skilled in the art will recognize that changes can be made in form and detail without departing from the spirit and the scope of the invention. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A seat belt tension sensor for attachment with a seat belt comprising:
    a) a housing;
    b) an anchor plate at least partially mounted in the housing, the anchor plate being adapted to be connected to a vehicle;
    c) a sensor mounted in the housing, the sensor being adapted to generate an electrical signal that is indicative of seat belt tension;
    d) a connector integral with the housing, the connector extending from the housing, the connector further including:
       d1) a bracket connected to the housing and extending away from the housing;
       d2) a plate connected to the bracket;
       d3) a shroud connected to the plate and extending away from the plate, the shroud extending toward the first end of the anchor plate;
       d4) an airgap located between the housing and the shroud; and
    e) at least one terminal mounted within the connector, the terminal having a first and second end, the first end extending into the housing and connected to the sensor, the second end extending into the shroud.

2. The seat belt tension sensor according to claim 1, wherein the bracket has a webbing.

3. The seat belt tension sensor according to claim 1, wherein the connector has a latch tab.

4. The seat belt tension sensor according to claim 1, wherein the connector is integrally molded with the housing.

5. The seat belt tension sensor according to claim 1, wherein the terminal is insert molded with the housing and the connector.

6. The seat belt tension sensor according to claim 1, wherein the sensor comprises at least one magnet and at least one magnetic field sensor.

7. The seat belt tension sensor according to claim 1, wherein the connector is adapted to mate with a wire harness.

8. A seat belt tension sensor comprising:
    a housing;
    an anchor plate having a first end and a second end, the second end being located within the housing and the first end extending from the housing;
    a sensor mounted in the housing, the sensor being adapted to generate an electrical signal that is indicative of seat belt tension;
    a connector mounted to the housing, the connector including:
       a support extending from the housing;
       a shroud connected to the support;
       the shroud and the housing having an airgap therebetween; and
       a plurality of terminals mounted within the shroud and the support, the terminals having a first and second end, the first end extending into the housing and connected to the sensor, the second end extending into the shroud.

9. The seat belt tension sensor according to claim 8, wherein the support has a webbing.

10. The seat belt tension sensor according to claim 8, wherein a plate is mounted between the support and the shroud.

11. The seat belt tension sensor according to claim 8, wherein the shroud has at least one latch tab.

12. The seat belt tension sensor according to claim 8, wherein the connector is molded with the housing as one piece.

13. The seat belt tension sensor according to claim 8, wherein the terminal is insert molded into the connector.

14. The seat belt tension sensor according to claim 8, wherein the sensor comprises at least one magnet and at least one magnetic field sensor.

15. The seat belt tension sensor according to claim 8, wherein the shroud is adapted to mate with a wire harness.

16. A seat belt tension sensor for attachment with a seat belt comprising:
   a) a housing;
   b) an anchor plate having a first end and a second end, the second end at least partially mounted in the housing;
   c) a sensor mounted in the housing, the sensor being adapted to generate an electrical signal that is indicative of seat belt tension;
   d) a connector having a bracket connected to the housing and extending away from the housing;
   e) the connector further having a shroud connected to the bracket and extending away from the bracket, the shroud extending toward the first end of the anchor plate;
   f) an airgap located between the housing and the shroud, the shroud spaced from the housing by the airgap; and
   g) at least one terminal mounted within the connector, the terminal having a first and second end, the first end extending into the housing and connected to the sensor, the second end extending into the shroud.

17. The seat belt tension sensor according to claim 16, wherein the shroud has at least one latch tab.

18. The seat belt tension sensor according to claim 16, wherein the shroud is adapted to mate with a wire harness.

* * * * *